(12) United States Patent
Verdonk

(10) Patent No.: US 6,256,512 B1
(45) Date of Patent: Jul. 3, 2001

(54) MOBILE ACCESS TO A PBX VIA A TLDN

(75) Inventor: Timothy C. Verdonk, Redmond, WA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/221,382

(22) Filed: Dec. 28, 1998

(51) Int. Cl.$^7$ ............................................. H04B 1/38
(52) U.S. Cl. ...................... 455/554; 455/462; 455/555
(58) Field of Search .................................. 455/445, 426, 455/462, 463, 554, 555

(56) References Cited

U.S. PATENT DOCUMENTS

| | | | |
|---|---|---|---|
| 5,506,887 | * 4/1996 | Emery et al. | 455/445 |
| 5,594,777 | * 1/1997 | Makkonen et al. | 455/462 |
| 6,014,377 | * 1/2000 | Gillespie | 455/445 |
| 6,029,067 | * 2/2000 | Pfundstein | 455/463 |

\* cited by examiner

Primary Examiner—Dwayne Bost
Assistant Examiner—Quochien B. Vuong

(74) Attorney, Agent, or Firm—John D. Crane; Bracewell & Patterson, L.L.P.

(57) ABSTRACT

Wireless calls to a private branch exchange (PBX) which does not support direct inward dialing—either due to limitations of the PBX itself or due to limitations of the PSTN to which the PBX is connected—are routed by means of an adjunct mobile switching center (MSC-A). An originating mobile switching center (MSC-O) serving the mobile unit which places the call by dialing the (typically) three- or four-digit PBX extension sends the dialed extension digits to the home location register (HLR) or service control point (SCP) via an ANSI-41 origination request (ORREQ) signaling message. The HLR or SCP transmits an ANSI-41 routing request (ROUTREQ) signaling message to the MSC-A requesting a temporary local directory number which will be used for connecting the call. The HLR relays the PBX extension number (which may be prefixed by "steering" digits that are used by the MSC-A to select the trunk group that connects the MSC-A to the PBX) that were received in the ORREQ message to the MSC-A via the ROUTREQ message. The MSC-A assigns a TLDN to the call and, when the call arrives, connects the call to the PBX and sends the extension to the PBX via trunk signaling. The PBX then routes the call in accordance with known methods. The invention thus allows a mobile unit to function as a PBX extension even if the PBX or the public telephone switch to which the PBX is connected to do not support direct inward dialing, providing virtual private network services.

18 Claims, 3 Drawing Sheets

MOBILE ACCESS TO A PBX VIA A TLDN

BACKGROUND OF THE INVENTION

1. Technical Field

The present invention relates generally to mobile-to-private branch exchange (PBX) telecommunications and in particular to delivering calls from an originating mobile switching center (MSC-O) serving a calling mobile subscriber to a called subscriber's land-line unit by dialing an extension within a PBX. Still more particularly, the present invention relates to employing existing message definitions to obtain a temporary local directory number (TLDN) to facilitate call delivery from the MSC-O to the called PBX extension.

2. Description of the Related Art

Private branch exchanges (PBXs), often referred to interchangeably as private, automatic branch exchanges (PABXs), are commonly employed by enterprises including hotels, large businesses, and government offices to provide external communications access to and from individual enterprise employees. A PBX typically includes a private switch, usually on the enterprise's premises, connected to a common group of lines or trunk circuits running from one or more central offices to provide communications service to a number of individual phones. Originally, PBXs required an operator to place any external calls and to connect incoming calls from the public telephone network to a particular PBX extension. Later, connection to outside lines was made automatic in response to dialing "9" or some other digit (often "0" in Europe), resulting in PABXs. Virtually all PBXs in North America are PABXs, where the terms are utilized interchangeably; however operator-assisted PBXs are still employed outside North America.

Within a PBX, calling parties may usually simply dial a three- or four-digit extension to connect to a called party also within the PBX. With the recent explosion of mobile unit usage by enterprise employees, many enterprises wish to extend support for three- or four-digit dialing for their employees' mobile units, a service often referred to as creating a "virtual private network." However, current solutions for allowing a mobile unit to dial an extension on a PBX rely on the PBX supporting direct inward dialing (DID), which provides the ability for a caller outside the PBX to call an internal extension without having to pass through an operator or attendant. The dialed extension digits are prefixed with sufficient digits to create a public switched telephone network (PSTN) translatable number which is utilized to route the call from the serving mobile switching center to the PBX. This technique does not work if the PBX or the PSTN switching center to which the PBX is connected does not support direct inward dialing, which is commonly the case in South America and many developing countries.

It would be desirable, therefore, to provide a mechanism allowing wireless infrastructure to support virtual private network service from a mobile phone when the associated PBX or PSTN switching center to which the PBX is connected does not support direct inward dialing.

SUMMARY OF THE INVENTION

It is therefore one object of the present invention to provide an improved method and apparatus for mobile-to-private branch exchange telecommunications.

It is another object of the present invention to provide a method and apparatus of delivering calls from a calling subscriber's mobile unit to the called subscriber's land-line unit by dialing an extension within a private branch exchange.

It is yet another object of the present invention to provide a method and apparatus for employing existing message definitions to utilize a temporary local directory number (TLDN) to facilitate call delivery from the calling subscriber's mobile unit dialing an extension within a private branch exchange.

The foregoing objects are achieved as is now described. Wireless calls to a private branch exchange (PBX) which does not support direct inward dialing—either due to limitations of the PBX itself or due to limitations of the PSTN to which the PBX is connected—are routed by means of an adjunct mobile switching center (MSC-A). An originating mobile switching center (MSC-O) serving the mobile unit which places the call by dialing the (typically) three- or four-digit PBX extension sends the dialed extension digits to the home location register (HLR) or service control point (SCP) via an ANSI-41 origination request (ORREQ) signaling message. The HLR or SCP transmits an ANSI-41 routing request (ROUTREQ) signaling message to the MSC-A requesting a temporary local directory number which will be used for connecting the call. The HLR relays the PBX extension number (which may be prefixed by "steering" digits that are used by the MSC-A to select the trunk group that connects the MSC-A to the PBX) that were received in the ORREQ message to the MSC-A via the ROUTREQ message. The MSC-A assigns a TLDN to the call and, when the call arrives, connects the call to the PBX and sends the extension to the PBX via trunk signaling. The PBX then routes the call in accordance with known methods. The invention thus allows a mobile unit to function as a PBX extension even if the PBX or the public telephone switch to which the PBX is connected to do not support direct inward dialing, providing virtual private network services.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
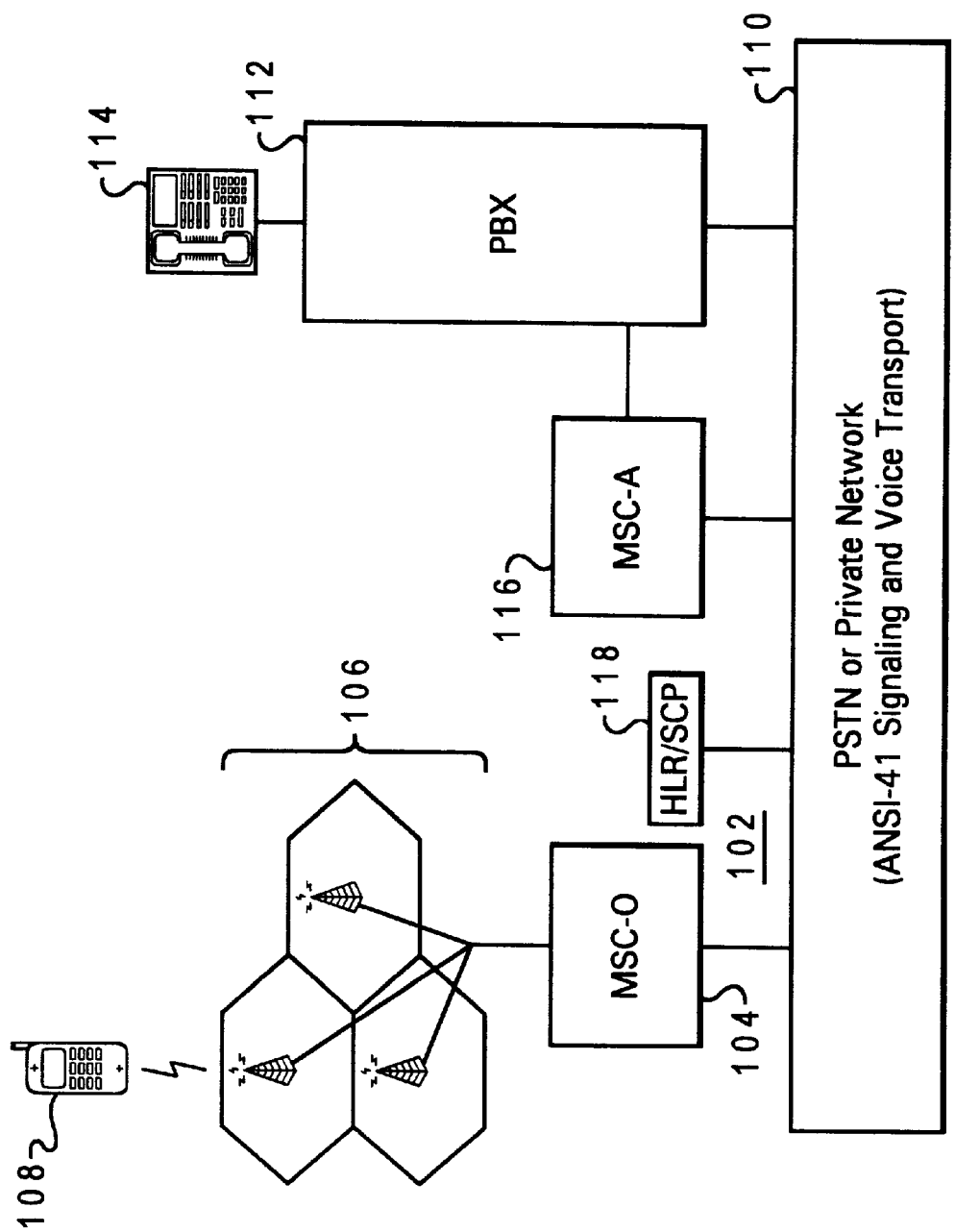
FIG. 1 depicts a diagram of a communications system in which a preferred embodiment of the present invention may be implemented.

With reference now to the figures and in particular with reference to FIG. 1, a diagram of a communications system in which a preferred embodiment of the present invention may be implemented is depicted. Communications system 102 includes an originating mobile switching center (MSC-O) 104 connected to a plurality of base transceiver stations (BTS's) 106. (Mobile switching centers are also frequently referred to as a mobile telecommunications switching office or "MTSO".) The calling subscriber's mobile unit 108 initiates wireless calls through BTS's 106, which are handled by MSC-O 104. MSC-O 104 is connected to the public switched telephone network (PSTN) 110, such as an integrated services digital network (ISDN). A private branch exchange (PBX) 112 including the called party's handset 114 is also connected to PSTN 110. In prior art systems, as previously described, if PBX 112 supports direct inward dialing, calls placed from mobile unit 108 to handset 114 by dialing the extension for handset 114 are prefixed with sufficient digits to create a PSTN-translatable number and are then routed by PSTN 110 and PBX 112 to handset 114.

In the present invention, an adjunct mobile switching center (MSC-A) 116 is connected to PSTN 110 and is also coupled to PBX 112 through a trunk or line interface. When mobile unit 108 dials only a PBX extension to place a call, the digits dialed are sent to a home location register (HLR) or service control point (SCP) 118. HLRs contain subscriber data of mobile units provisioned by the mobile's wireless carrier, as opposed to a visitor location register (VLR) for temporary storage of subscriber data of mobile units provisioned with an HLR but located within the area served by the respective mobile switching center. SCPs are a remote database separate from an actual switch supplying translation and routing data needed to deliver advanced network services within an advanced intelligent network (AIN). Either an HLR or an SCP may be employed for the present invention.

Mobile switching center MSC-O 104 sends the PBX extension dialed on mobile unit 108 to HLR/SCP 118 in an IS-41 (ANSI-41) ORREQ message. HLR/SCP 118, in turn, requests a temporary local directory number (TLDN) from MSC-A 122 by transmitting a IS-41 ROUTREQ message to MSC-A 122. The ROUTREQ message includes the PBX extension number digits, modified if necessary by HLR/SCP 118, on which MSC-A 122 will translate to connect to the called subscriber's handset 114. Those skilled in the art will recognize that the ROUTREQ message definition required to obtain a TLDN from MSC-A 122 as described above already exists within the IS-41 standard, but is currently utilized primarily for voice mail retrieval rather than call delivery.

In response to receiving the ROUTREQ message, MSC-A 122 allocates a TLDN at MSC-A 122 for the wireless call from mobile unit 108 being delivered to handset 114 within PBX 112. The TLDN is returned by MSC-A 116 to the HLR/SCP 118. Once the HLR/SCP 118 has obtained a TLDN for the wireless call being delivered, HLR/SCP 118 relays the TLDN to MSC-O 104, which translates on the provided TLDN digits in accordance with the known art to connect the call to MSC-A 116 via PSTN 110. Upon receiving the call, MSC-A 116 then connects the call to PBX 112 and outpulses the dialed extension digits to PBX 112. PBX 112 routes the connected call to handset 114 in accordance with conventional methods.

The present invention allows calls originated by dialing only the PBX extension of a called party on a mobile unit to be delivered to the PBX. Thus, the invention enables a mobile unit to act as a PBX extension even if the PBX does not support direct inward dialing. This allows virtual private network services to be provided in geographic regions where PBXs and/or PSTN switching networks do not support direct inward dialing, such as developing countries.

Figure 2:
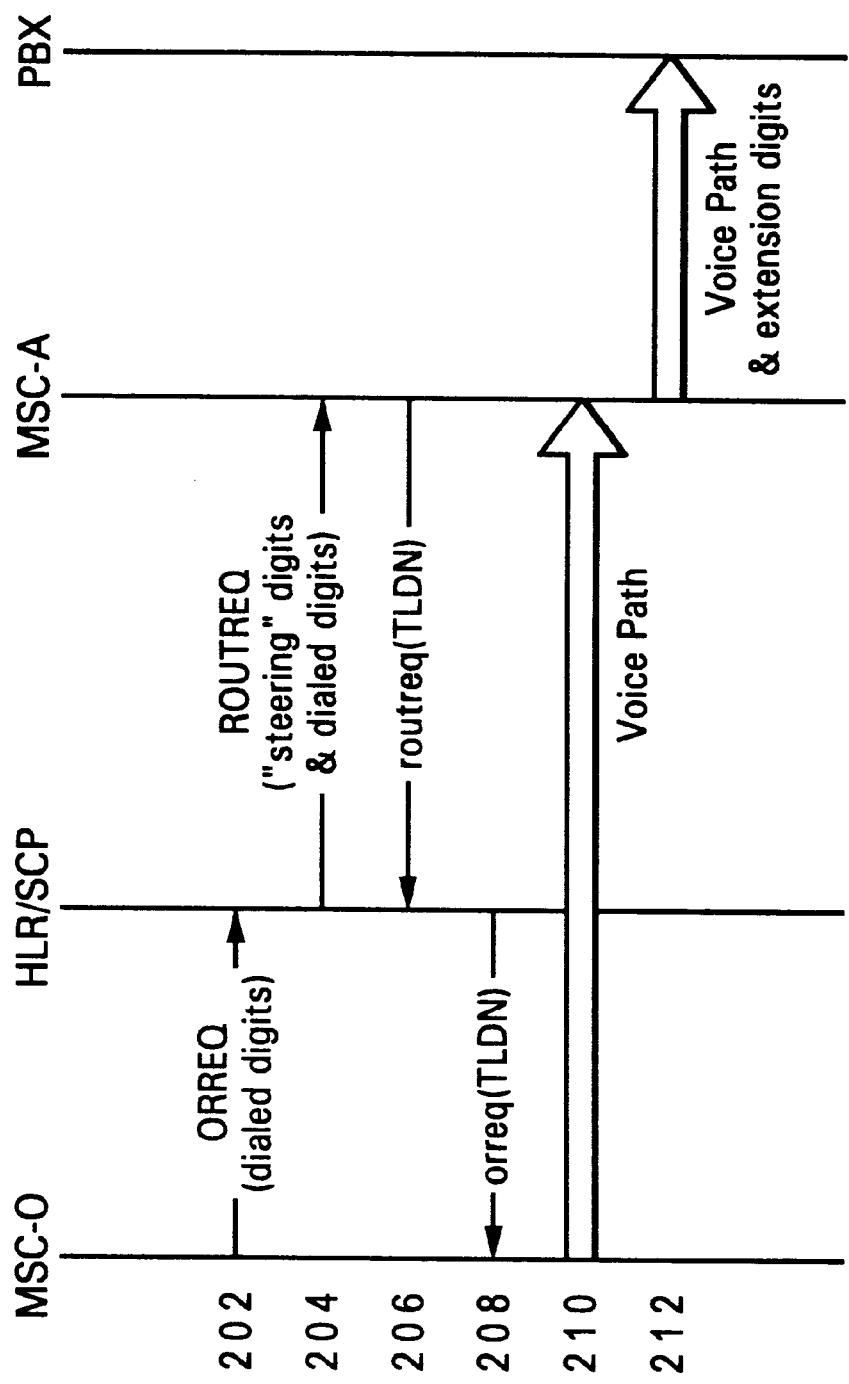
FIG. 2 is a data flow diagram for a process of delivering a wireless call to a PBX extension when only the extension digits were dial on the originating mobile unit in accordance with a preferred embodiment of the present invention.

Referring to FIG. 2, a data flow diagram for a process of delivering a wireless call to a PBX extension when only the extension digits were dial on the originating mobile unit in accordance with a preferred embodiment of the present invention is illustrated. The illustrated portion of the data flow does not include all tasks required for setup and delivery of the call, but only so much of the process as is necessary for an understanding of the invention is illustrated. Upon receiving a call request containing only a three- or four-digit PBX extension, the originating mobile switching center transmits an origination request (ORREQ) message 202 containing the dialed digits to the home location register or service control point. The HLR/SCP, in turn, transmits a routing request (ROUTREQ) message 204 which may include "steering" digits for routing the call to the PBX plus the dialed digits to the adjunct mobile switching center.

Upon receiving the ROUTREQ message, the adjunct mobile switching station allocates a TLDN to the wireless call and returns the allocated TLDN to the HLR/SCP in a ROUTREQ return (routreq) message 206. The HLR/SCP relays the allocated TLDN to the originating mobile switching center in a ORREQ return (orreq) message 208. The originating mobile switching center then set up and connects the call on a voice path 210 to the adjunct mobile switching center via a land-line network utilizing the allocated TLDN. Upon receiving the call, the adjunct mobile switching center connects the call on a voice path 212 to the PBX and outpulses the dialed PBX extension. The PBX then delivers handles connection of the call to the dialed extension in accordance with the known art.

Figure 3:
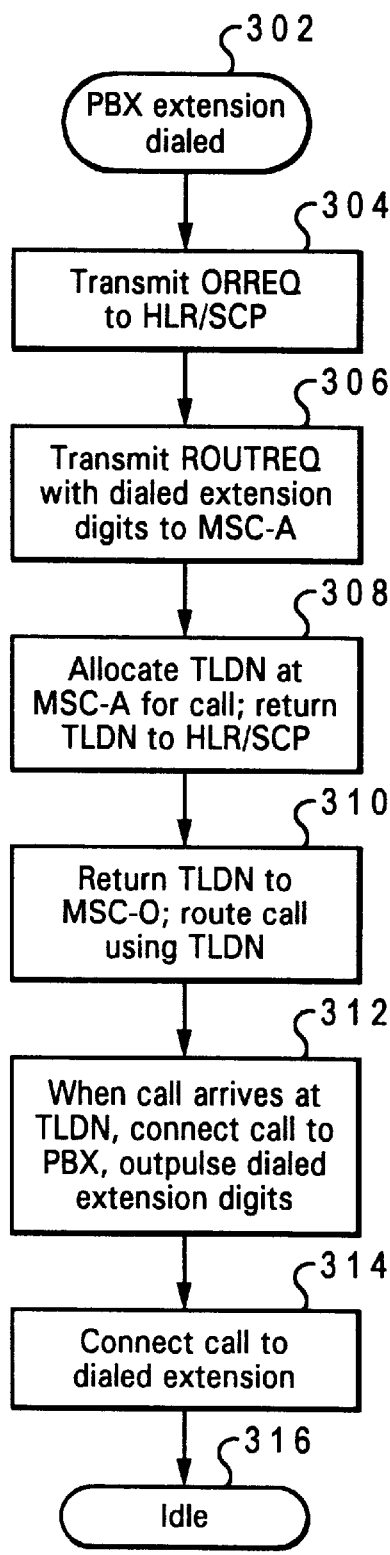
FIG. 3 depicts a high level flowchart for a process of delivering a wireless call to a PBX extension when only the extension digits were dial on the originating mobile unit in accordance with a preferred embodiment of the present invention.

With reference now to FIG. 3, a high level flowchart for a process of delivering a wireless call to a PBX extension when only the extension digits were dial on the originating mobile unit in accordance with a preferred embodiment of the present invention is depicted. The process begins at step 302, which depicts receiving a wireless call request containing only a three- or four-digit PBX extension. The process then passes to step 304, which illustrates transmitting a ORREQ message from the originating mobile switching center to the home location register or service control point.

The process next passes to step 306, which depicts transmitting a ROUTREQ message with the dialed extension digits from the home location register or service control point to the adjunct mobile switching center connected to the PBX associated with the mobile unit. The process then passes to step 308, which depicts allocating a temporary local directory number at the adjunct mobile switching center for the wireless call being delivered to the PBX, and returning the allocated temporary local directory number to the home location register or service control point in a ROUTREQ return response message.

The process passes next to step 310, which illustrates returning the allocated temporary local directory number from the home location register or service control point to the originating mobile switching center in an ORREQ return response message, and routing the wireless call at the originating mobile switching center to the adjunct mobile switching center via a land-line network utilizing the allocated temporary local directory number. The process then passes to step 312, which depicts connecting the call received at the allocated TLDN to the PBX via a line or trunk interface to the PBX and outpulsing the dialed extension digits to the PBX. The process next passes to step 314, which illustrates routing the call to the appropriate extension within the PBX. The process finally passes to step 316, which illustrates the process becoming idle until another wireless call is to be delivered to the PBX utilizing a PBX extension.

The present invention allows mobile units to act as PBX extensions via an adjunct mobile switching center coupled to the PBX through a line or trunk interface. Although characterized above as an alternative suitable for circumstances in which the PBX does not support direct inward dialing, the alternative of the present invention may also be employed with a PBX which does support direct inward dialing. In some situations, the present invention may provide a faster or more cost-effective means of delivering wireless calls from a mobile unit in which only the PBX extension is dialed than direct inward dialing.

It is important to note that while the present invention has been described in the context of a fully functional communications system, those skilled in the art will appreciate that the mechanism of the processes of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of delivering a wireless call to a dialed private branch exchange extension, comprising:

receiving a wireless call request containing the dialed private branch exchange extension at an originating mobile switching center;

transmitting a request from the originating mobile switching center to an adjunct mobile switching center connected to a private branch exchange including the dialed private branch exchange extension via a line or trunk interface;

allocating a temporary local directory number for the wireless call at the adjunct mobile switching center, wherein the allocated temporary local directory number is made available within the adjunct mobile switching center to connect the wireless call to the private branch exchange for a duration of the wireless call;

connecting the wireless call to the adjunct mobile switching center utilizing the allocated temporary local directory number; and connecting the wireless call to the private branch exchange at the adjunct mobile switching center and outpulsing the dialed private branch exchange extension to the private branch exchange.

2. The method of claim 1, wherein the step of transmitting a request from the originating mobile switching center to an adjunct mobile switching center connected to a private branch exchange via a line or trunk interface further comprises:

transmitting an IS-41 ORREQ message containing the dialed private branch exchange extension from the originating mobile switching center to a service resource; and transmitting an IS-41 ROUTREQ message containing steering digits for connecting the call to the private branch exchange and the dialed private branch exchange extension from the service resource to the adjunct mobile switching center.

3. The method of claim 2, further comprising:

returning the allocated temporary local directory number to the service resource in an IS-41 ROUTREQ response message.

4. The method of claim 2, further comprising:

returning the allocated temporary local directory number to the originating mobile switching center in an IS-41 ORREQ response message.

5. The method of claim 1, wherein the step of transmitting a request from the originating mobile switching center to an adjunct mobile switching center connected to a private branch exchange via a line or trunk interface further comprises:

transmitting a first request from the originating mobile switching center to a service resource; and transmitting a second request from the service resource to the adjunct mobile switching center.

6. The method of claim 5, wherein the step of transmitting a first request from the originating mobile switching center to a service resource further comprises:

transmitting the first request to a home location register.

7. The method of claim 5, wherein the step of transmitting a first request from the originating mobile switching center to a service resource further comprises:

transmitting the first request to a service control point.

8. A system for delivering a wireless call to a dialed private branch exchange extension, comprising:

an originating mobile switching center receiving a wireless call request containing the dialed private branch exchange extension;

an adjunct mobile switching center allocating a temporary local directory number for the wireless call in response to receiving a request regarding routing of the wireless call from the originating mobile switching center;

a private branch exchange connected to the adjunct mobile switching center via a line or trunk interface, wherein the originating mobile switching center connects the wireless call to the adjunct mobile switching center utilizing the allocated temporary local directory number and the adjunct mobile switching center connects the wireless call received at the temporary local directory number to the private branch exchange and outpulses the dialed private branch exchange extension to the private branch exchange.

9. The system of claim 8, further comprising:

a service resource receiving an origination request from the originating mobile switching center for the wireless call and transmitting a route request to the adjunct mobile switching center for the wireless call.

10. The system of claim 9, wherein the service resource receives an IS-41 ORREQ message containing the dialed private branch exchange extension.

11. The system of claim 9, wherein the service resource transmits an IS-41 ROUTREQ message containing steering digits for connecting the wireless call to the private branch exchange and the dialed private branch exchange extension.

12. The system of claim 9, wherein the service resource is a home location register.

13. The system of claim 9, wherein the service resource is a service control point.

14. A computer program product within a computer usable medium, comprising:

instructions, responsive to receiving a request containing a dialed private branch exchange extension for routing a wireless call to a private branch exchange including the dialed private branch exchange extension, for allocating a temporary local directory number within an adjunct mobile switching center connected to the private branch exchange via a line or trunk interface for the wireless call, wherein the allocated temporary local directory number is made available within the adjunct mobile switching center to connect the wireless call to the private branch exchange for a duration of the wireless call;

instructions for returning the allocated temporary local directory number to a service resource initiating the request; and instructions, responsive to receiving the wireless call at the allocated temporary local directory number within the adjunct mobile switching center, for connecting the wireless call to the private branch exchange via the trunk or line interface and outpulsing the dialed private branch exchange extension to the private branch exchange.

15. The computer program product of claim 14, further comprising:

instructions for extracting the dialed private branch exchange extension and steering digits for routing the wireless call to the private branch exchange from the request.

16. The computer program product of claim 14, wherein the instructions for returning the allocated temporary local directory number to a service resource initiating the request further comprise:

instructions transmitting an IS-41 ROUTREQ response message containing the allocated temporary local directory number to the service resource initiating the request.

17. A computer program product within a computer usable medium, comprising:

instructions, responsive to receiving a wireless call request containing a dialed private branch exchange extension, for transmitting a routing request containing the dialed private branch exchange extension for the wireless call to an adjunct mobile switching center connected to a private branch exchange including the dialed private branch exchange extension via a line or triunk interface;

instructions for extracting a temporary local directory number allocated within the adjunct mobile switching center for the wireless call from a response to the routing request; and instructions for connecting the wireless call to the allocated temporary local directory number via a land line communications path to connect the wireless call to the private branch exchange through the adjunct mobile switching center.

18. The computer program product of claim 17, wherein the instructions for connecting the wireless call to the allocated temporary local directory number via a land line communications path further comprise:

instructions connecting the wireless call to an adjunct mobile switching center connected to a private branch exchange serving the dialed private branch exchange extension via a trunk or line interface.

* * * * *